US012732649B2

(12) United States Patent
Wang et al.

(10) Patent No.: US 12,732,649 B2
(45) Date of Patent: Sep. 8, 2026

(54) SYSTEM AND METHOD OF FOVEATED RENDERING OF OMNIDIRECTIONAL MEDIA CONTENT

(71) Applicant: MEDIATEK INC., Hsinchu (TW)

(72) Inventors: Xin Wang, San Jose, CA (US); Lulin Chen, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/371,507

(22) Filed: Sep. 22, 2023

(65) Prior Publication Data

US 2024/0129561 A1 Apr. 18, 2024

Related U.S. Application Data

(60) Provisional application No. 63/379,919, filed on Oct. 18, 2022.

(51) Int. Cl.

| | |
|---|---|
| ***H04N 21/23*** | (2011.01) |
| ***G06F 3/01*** | (2006.01) |
| ***H04N 21/2187*** | (2011.01) |
| ***H04N 21/2343*** | (2011.01) |
| ***H04N 21/238*** | (2011.01) |
| ***H04N 21/239*** | (2011.01) |
| ***H04N 21/81*** | (2011.01) |

(52) U.S. Cl.
CPC ..... *H04N 21/234363* (2013.01); *G06F 3/013* (2013.01); *H04N 21/2187* (2013.01); *H04N 21/238* (2013.01); *H04N 21/2393* (2013.01); *H04N 21/816* (2013.01)

(58) Field of Classification Search
None
See application file for complete search history.

(56) References Cited

U.S. PATENT DOCUMENTS

2017/0236252 A1* 8/2017 Nguyen ................ G06T 3/4092 345/419

* cited by examiner

*Primary Examiner* — Samira Monshi
(74) *Attorney, Agent, or Firm* — toutman pepper locke; Tim Tingkang Xia, Esq.

(57) ABSTRACT

In certain aspects of the disclosure, a method, a computer-readable medium, and a system for foveated rendering of omnidirectional media content are provided. The method includes receiving a request to access a stream of media data associated with the omnidirectional media content at a point in time the client is accessing the stream of media data for foveated rendering of the omnidirectional media content; determining an initial portion of media data, starting from the point in time the client requests to access, for foveated rendering of the omnidirectional media content for delivery to a client device; and transmitting, in response to the request, the initial portion of media data. The initial portion of media data comprises a portion of the omnidirectional media content for a viewport that is foveated rendered or to be displayed using foveated rendering on the client device according to the request.

15 Claims, 7 Drawing Sheets

```
class FvvpSampleEntry() extends SphereRegionSampleEntry('fvvp') {
  FvvpInfoBox() fvvp_info; // mandatory
}

class Fvp2SampleEntry() extends SphereRegionSampleEntry('fvp2') {
  FvvpInfoBox() fvvp_info; // mandatory
}

class FvvpInfoBox extends FullBox('fvif', version, 0) {
  string viewport_description;
  if (version > 0) {
    unsigned int(2) viewpoint_idc;
    bit(6) reserved = 0;
    if(viewpoint_idc == 1)
      unsigned int(32) fvif_viewpoint_id;
  }
  unsigned int(8) num_foveal_levels;
  unsigned int(8) foveal_shape;
  for (i = 0; i < num_foveal_levels; i++)
      if (foveal_shape == 0) { //rectangular foveal
        unsigned int(32) static_azimuth_range;
        unsigned int(32) static_elevation_range;
      }
      if (foveal_shape == 1) // circular foveal
        unsigned int(32) static_azimuth_range;
    unsigned int(8) quality_ranking;
  }
  unsigned int(8) quality_ranking;
}
```

FIG. 4

```
class FoveatedViewportSample() extends SphereRegionSample() {
  if (viewpoint_idc == 2)
     unsigned int(32) viewpoint_id;
}
```

FIG. 5

| | Description | Key Name | Header Name | Type & Unit | Value Definition |
|---|---|---|---|---|---|
| 601 | **Azimuth** | 'azim' | SSDA-Request | Integer, degrees | Azimuth component of a spherical viewport [OMAF] |
| 602 | **Elevation** | 'elev' | SSDA-Request | Integer, degrees | Elevation component of a spherical viewport [OMAF] |
| 603 | **Foveal Levels** | 'flvl' | SSDA-Request | Integer | Number of foveated area levels. Usually, it is equal to<br>0: foveal only, implying no foveated rendering,<br>1: foveal and peripheral,<br>2: foveal, blended and peripheral,<br>n>2: foveal, n-2 blended and peripheral.<br><br>For each level of foveated area of spherical region shape, a list of Azimuth range, Elevation range, and quality ranking are provided to indicate:<br><br>For each level of foveated area of circular region shape, a list of Azimuth range and Quality Ranking are provided to indicate: |
| 604 | **Foveal Shape** | 'fovs' | SSDA-Request | Integer | Foveal shape: 0 = rectangular, 1 = circle, others = reserved |
| 605 | **Azimuth range** | 'azim' | SSDA-Request | Integer, degrees | Azimuth range of a spherical viewport [OMAF] |
| 606 | **Elevation range** | 'elev' | SSDA-Request | Integer, degrees | Elevation range of a spherical viewport [OMAF] |
| 607 | **Quality Ranking** | 'qrnk' | SSDA-Request | Integer | Quality ranking of a foveated area or region [OMAF]<br><br>Note that, if more appropriate, this quality ranking parameter can be replaced or supplemented with another parameter for a bitrate in units of kbps. |

FIG. 6

SYSTEM AND METHOD OF FOVEATED RENDERING OF OMNIDIRECTIONAL MEDIA CONTENT

CROSS-REFERENCE TO RELATED APPLICATION(S)

This application claims the benefits of U.S. Provisional Application Ser. No. 63/379,919, entitled "SYSTEM AND METHOD OF FOVEATED RENDERING OF OMNIDIRECTIONAL MEDIA CONTENT" and filed on Oct. 18, 2022, which is expressly incorporated by reference herein in its entirety.

BACKGROUND

Field

The present disclosure relates generally to content delivery, and more particularly, to systems and methods of foveated rendering of omnidirectional media content.

Background

The statements in this section merely provide background information related to the present disclosure and may not constitute prior art.

Foveated rendering is a rendering technique which uses an eye tracker integrated with a virtual reality headset to reduce the rendering workload by greatly reducing the image quality in the peripheral vision (outside of the zone gazed by the fovea).

There are already GPU supports for foveated rendering. For instance, it is already seeing GPU rendering load reductions of 57%, bringing the average shading rate using dynamic foveated rendering down to 16% from around 24%.

Thus, it is important to signal if and how a viewport should be rendered using foveated rendering, such a viewport is called "foveated viewport". It is also expected to see transport delivery load reduction if only content for foveated rendering or foveated rendered content is delivered to a client display device. The goal is to minimize content rendering and delivery loads if displayed content is foveated rendered.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In certain aspects of the disclosure, a method, a computer-readable medium, and an apparatus are provided.

In one aspect, the disclosure relates to a method of foveated rendering of omnidirectional media content implemented by a server in communication with a client device.

The method comprises receiving, from the client device, a request to access a stream of media data associated with the omnidirectional media content at a point in time the client is accessing the stream of media data for foveated rendering of the omnidirectional media content; determining an initial portion of media data, starting from the point in time the client requests to access, for foveated rendering of the omnidirectional media content for delivery to the client device; and transmitting, in response to the request to access the stream of media data, the initial portion of media data.

In one embodiment, the initial portion of media data comprises a portion of the omnidirectional media content for a viewport that is foveated rendered or to be displayed using foveated rendering on the client device according to the request.

In one embodiment, the request to access the stream of media data is an HTTP request and is received from the client device prior to the server transmitting the client device any manifest data for foveated rendering of the omnidirectional media content; and the initial portion of media data is transmitted prior to, or in conjunction with, transmitting first manifest data for foveated rendering of the omnidirectional media content to the client device.

In one embodiment, the request comprises parameters for foveated rendering.

In one embodiment, said determining the initial portion of the media data for foveated rendering comprises accessing the media data comprising a plurality of media tracks, each media track comprising different media data corresponding to different spatial portions of the omnidirectional media content; determining, based on the request, a group of media tracks from the plurality of media tracks corresponding to a viewport of the client device; and generating a single track adapted to comprise the initial portion of media data and transmitting the adapted track comprising the initial portion of media data to the client device.

In one embodiment, the initial portion of media data comprises a plurality of stitched media data tiles, each corresponding one of the differential portions of the omnidirectional media content, from the plurality of media tracks.

In one embodiment, the omnidirectional media content is live omnidirectional media content and the point in time is the latest time of the live omnidirectional media content that the server possesses.

In one embodiment, the request to access the stream of media data comprises one or more parameters of the live omnidirectional media content, the client device, or a combination thereof.

In one embodiment, the request to access the stream of media data comprises one or more parameters that indicate a network bandwidth in terms of bitrates, and a group of media tracks having their bitrates matching the ones in the one or more parameters.

In one embodiment, the request to access the stream of media data comprises one or more parameters configured to support bitrate adaptation including representation switching, temporal adaptation, spatial adaptation including viewport/viewpoint dependent media processing, and/or content adaptation including pre-rendering and storyline selection.

In another aspect, the disclosure relates to a system comprising at least one processor configured to perform a method of foveated rendering of omnidirectional media content.

The method comprises receiving, from a client device, a request to access a stream of media data associated with the omnidirectional media content at a point in time the client is accessing the stream of media data for foveated rendering of the omnidirectional media content; determining an initial portion of media data, starting from the point in time the client requests to access, for foveated rendering of the omnidirectional media content for delivery to the client device; and transmitting, in response to the request to access the stream of media data, the initial portion of media data.

In one embodiment, the initial portion of media data comprises a portion of the omnidirectional media content for a viewport that is foveated rendered or to be displayed using foveated rendering on the client device according to the request.

In one embodiment, the request to access the stream of media data is an HTTP request and is received from the client device prior to the server transmitting the client device any manifest data for foveated rendering of the omnidirectional media content; and the initial portion of media data is transmitted prior to, or in conjunction with, transmitting first manifest data for foveated rendering of the omnidirectional media content to the client device.

In one embodiment, the request comprises parameters for foveated rendering.

In one embodiment, said determining the initial portion of the media data for foveated rendering comprises accessing the media data comprising a plurality of media tracks, each media track comprising different media data corresponding to different spatial portions of the omnidirectional media content; determining, based on the request, a group of media tracks from the plurality of media tracks corresponding to a viewport of the client device; and generating a single track adapted to comprise the initial portion of media data and transmitting the adapted track comprising the initial portion of media data to the client device.

In one embodiment, the initial portion of media data comprises a plurality of stitched media data tiles, each corresponding one of the differential portions of the omnidirectional media content, from the plurality of media tracks.

In one embodiment, the omnidirectional media content is live omnidirectional media content and the point in time is the latest time of the live omnidirectional media content that the server possesses.

In one embodiment, the request to access the stream of media data comprises one or more parameters of the live omnidirectional media content, the client device, or a combination thereof.

In one embodiment, the request to access the stream of media data comprises one or more parameters that indicate a network bandwidth in terms of bitrates, and a group of media tracks having their bitrates matching the ones in the one or more parameters.

In one embodiment, the request to access the stream of media data comprises one or more parameters configured to support bitrate adaptation including representation switching, temporal adaptation, spatial adaptation including viewport/viewpoint dependent media processing, and/or content adaptation including pre-rendering and storyline selection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 shows exemplary syntaxes for sample entry, according to some embodiments.

FIG. 5 shows exemplary of sample syntax, according to some embodiments.

FIG. 6 shows a list of adaptation parameters for foveated rendering, according to some embodiments.

DETAILED DESCRIPTION

Figure 1:
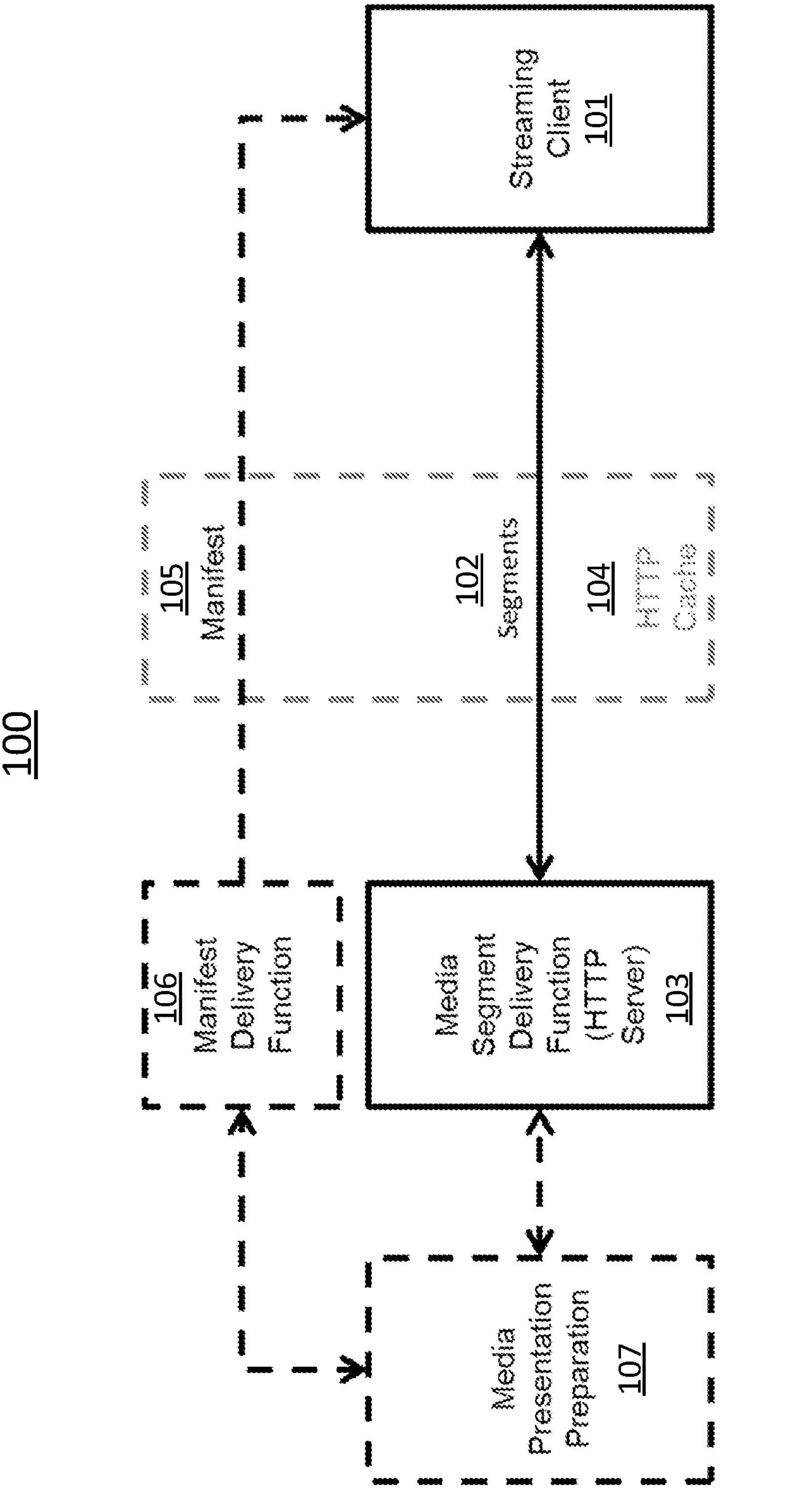
FIG. 1 shows an exemplary configuration of an adaptive streaming system, according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Conventional adaptive media streaming techniques rely on the client device to perform adaptation, which the client typically performs based on adaptation parameters that are determined by and/or available to the client. For example, the client can receive a description of the available media (e.g., including different available bitrates), determine its processing capabilities and/or network bandwidth, and use the determined information to select a best available bitrate from the available bitrates that meets the client's current processing capabilities. The client can update the associated adaptation parameters over time, and adjust the requested bitrate accordingly to dynamically adjust the content for changing client conditions.

Deficiencies can exist with conventional client-side streaming adaptation approaches. In particular, such paradigms place the burden of content adaptation on the client, such that the client is responsible for obtaining its relevant processing parameters and processing the available content to select among the available representations to find the best representation for the client's parameters. The adaptation process is iterative, such that the client must repeatedly perform the adaptation process over time.

In particular, client-side driven streaming adaptation, in which the client requests content based on the user's viewport, often requires the client to make multiple requests for tiles and/or portions of pictures within a user's viewport at any given time (e.g., which may only be a small portion of the available content). Accordingly, the client subsequently receives and processes the various tiles or portions of the pictures, which the client must combine for display. This is generally referred to as client-side dynamic adaptation (CSDA). Because CSDA approaches require the client to download multiple data for multiple tiles, the client is often required to stitch the tiles on-the-fly at the client device. This can therefore require seamless stitching of tile segments on the client side. CSDA approaches also require consistent quality management for retrieved and stitched tile segments, e.g., to avoid stitching of tiles of different qualities. Some CSDA approaches attempt to predict a user's movement (and thus the viewport), which typically requires buffer management to buffer tiles related to the users predicted movement, and possibly downloading tiles that may not ultimately be used (e.g., if the user's movement is not as predicted).

Accordingly, a heavy computational and processing burden is placed on the client, and it requires the client device to have sufficient minimum-processing capabilities. Such client-side burdens can be further compounded based on certain types of content. For example, some content (e.g., omnidirectional media content) requires the client to perform various compute-intensive processing steps in order to decode and render the content to the user. To address these and other problems with conventional client-side driven streaming adaptation approaches, the techniques described herein provide for server-side adaptation where a media and/or network server may perform aspects of streaming adaptation that are otherwise conventionally performed by the client device.

In some embodiments, the client device can provide foveated rendering information to the server. For example, in some embodiments the client device can provide foveated viewport information to the server for foveated rendering of omnidirectional media. For example, the foveated viewport information may include foveated viewport direction, size, height, and/or width. The server can use the foveated viewport information to construct the foveated viewport for the client at the server-side, instead of requiring the client device to perform the stitching and construction of the foveated viewport. The server may then subsequently determine the regions and/or tiles corresponding to the foveated viewport and perform stitching of the regions and/or tiles Accordingly, spatial media processing tasks can be moved to the server-side of adaptive streaming implementations. According to some embodiments, in response to detecting that the viewport has changed, the client device may transmit second parameters to the server.

In some embodiments, the techniques described herein for derived track selection and track switching can be used to enable track selection and switching, at run time, from an alternate track group and a switch track group, respectively for delivery to the client device. Therefore, a server can use a derived track that includes selection and switching derivation operations that allow the server to construct a single media track for the user based on the available media tracks (e.g., from among media tracks of different bitrates). Transformation operations are described herein that provide for track derivation operations that can be used to perform track selection and track switching at the sample level (e.g., not the track level). As described herein, a number of input tracks (e.g., tracks of different bitrates, qualities, etc.) can be processed by track selection derivation operations to select samples from one of the input tracks at the sample level to generate the media samples of the output track. Accordingly, the selection-based track derivation techniques described herein allow for the selection of samples from a track in a group of tracks at the time of the derivation operation. In some embodiments, the selection-based track derivation can provide for a track encapsulation of track samples as the output from the derivation operation(s) of a derived track, where the track samples are selected or switched from a group of tracks. As a result, a track selection derivation operation can provide samples from any of the input tracks to the derivation operation as specified by the transformations of the derived track to generate the resulting track encapsulation of the samples.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary configuration of a generic adaptive streaming system 100, according to some embodiments. A streaming client 101 in communication with a server, such as HTTP server 103, may receive a manifest 105. The manifest 105 describes the content (e.g., video, audio, subtitles, bitrates, etc.). In this example, the manifest delivery function 106 may provide the streaming client 101 with the manifest 105. The manifest delivery function 106 and the server 103 may communicate with media presentation preparation module 107. The streaming client 101 can request (and receive) segments 102 from the server 103 using, for example, HTTP cache 104 (e.g., a server-side cache and/or cache of a content delivery network). The segments can be, for example, associated with short media segments, such as 6-10 second long segments. For further details of an illustrative example, see e.g., w18609, "Text of ISO/IEC FDIS 23009-1:2014 4th edition", July 2019, Gothenburg, SE, which is hereby incorporated by reference herein in its entirety.

According to some examples, the manifest includes a media presentation description (MPD). The MPD includes a series of periods that divide the content into different time portions that each have different IDs and start times (e.g., 0 seconds, 100 seconds, 300 seconds, etc.). Each period can include a set of a number of adaptation sets (e.g., subtitles, audio, video, etc.). Each adaptation set can include a set of representations to provide different qualities of the associated content of the adaptation set. Each representation can have segment information for the different qualities.

In adaptive streaming configurations, the streaming client, such as streaming client 101, may implement the adaptation logic for streaming adaptation. In particular, the streaming client 101 can receive the MPD, and select (e.g., based on the client's adaptation parameters, such as bandwidth, CPU processing power, etc.) a representation for each period of the MPD (which may change over time, given different network conditions and/or client processing capabilities), and retrieve the associated segments for presentation to the user. As the client's adaptation parameters change, the client can select different representations accordingly (e.g., lower bitrate data if the available network bandwidth decreases and/or if client processing power is low, or higher bitrate data if the available bandwidth increases and/or if client processing power is high). The adaptation logic may include static as well as dynamic adaptation, in selecting segments from different media streams according to some adaptation parameters. This is described, for example, in "MPD Selection Metadata" of w18609, which is hereby incorporated by reference herein in its entirety.

Figure 2:
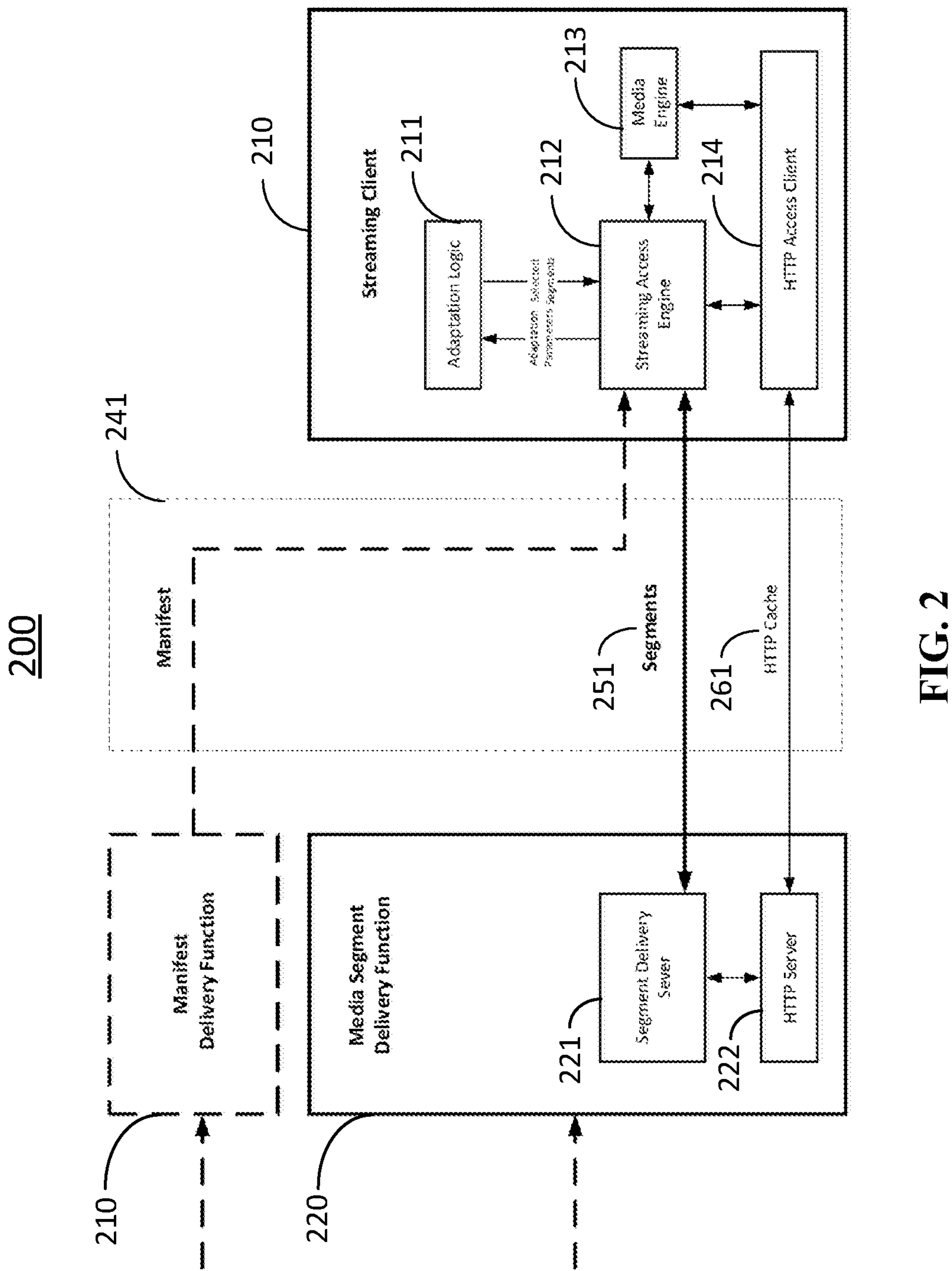
FIG. 2 shows an exemplary configuration of a client-side adaptive streaming system, according to some embodiments.

FIG. 2 shows an exemplary configuration 200 of a client-side dynamic adaptive streaming system. As described herein, the configuration 200 comprises a streaming client 210 in communication with server 222 via HTTP cache 261. The server 222 may be comprised in the media segment delivery function 220, which includes segment delivery server 221. The segment delivery server 221 is configured to transmit segments 251 to the streaming access engine 212. The streaming access engine further receives the manifest 241 from the manifest delivery function 230. As described herein, in conventional configurations, the client device 210 performs the adaptation logic 211. The client device 210 receives the manifest via the manifest delivery function 230. The client device 210 also receives adaptation parameters from streaming access engine 212 and transmits requests for the selected segments to the streaming access engine 212. The streaming access engine is also in communication with media engine 213.

There are deficiencies with above-mentioned client-side streaming adaptation approaches. In particular, such paradigms are designed so that the client both obtains the information needed for content adaptation (e.g., adaptation parameters), receives a full description of all available content and associated representations (e.g., different bitrates), and processes the available content to select among the available representations to find the one that best suits the client's adaptation parameters. The client must further repeatedly perform the process over time, including updating the adaptation parameters and selecting the same and/or different representations depending on the updated parameters. Accordingly, a heavy burden is placed on the client, and it requires the client device to have sufficient processing capabilities. Further, such configurations often require the client to make a number of requests in order to start a streaming session, including (1) obtaining a manifest and/or other description of the available content, (2) requesting an initialization segment, and (3) then requesting content segments. Accordingly, such approaches often require three or more calls. Assuming for an illustrative example that each call takes approximately 500 ms, the initiation process can consume one or more seconds of time.

For some types of content, such as omnidirectional media, the client is required to perform compute-intensive operations. For example, conventional omnidirectional media processing delivers tiles to the requesting client. The client device therefore needs to construct a viewport from the decoded tiles in order to render the viewport to the user. Such construction and/or stitching can require a lot of client-side processing power. Further, such approaches may require the client device to receive some content that is not ultimately rendered into the viewport, consuming unnecessary storage and bandwidth.

In some embodiments, the techniques described herein provide for server-side selection and/or switching of media tracks, where a server may perform aspects of streaming adaptation that are otherwise conventionally performed by the client device. Accordingly, the techniques provide for a major paradigm shift compared to conventional approaches. In some embodiments, the techniques can move some and/or most of the adaptation logic to the server, such that the client can simply provide the server with appropriate adaptation information and/or parameters, and the server can generate an appropriate media stream for the client. As a result, the client processing can be reduced to receiving and playing back the media, rather than also performing the adaptation.

In some embodiments, the techniques provide for a set of adaptation parameters. The adaptation parameters can be collected by clients and/or networks and communicated to the servers to support server-side content adaptation. For example, the parameters can support bitrate adaptation (e.g., for switching among different available representations). As another example, the parameters can provide for temporal adaptation (e.g., to support trick plays). As a further example, the techniques can provide for spatial adaptation (e.g., viewport and/or viewport dependent media processing adaptation). As another example, the techniques can provide for content adaptation (e.g., for pre-rendering, storyline selection, and/or the like).

In some embodiments, the techniques described herein for derived track selection and track switching can be used to enable track selection and switching, at run time, from an alternate track group and a switch track group, respectively for delivery to the client device. Therefore, a server can use a derived track that includes selection and switching derivation operations that allow the server to construct a single media track for the user based on the available media tracks (e.g., from among media tracks of different bitrates). See also, for example, the derivations included in e.g., m54876, "Track Derivations for Track Selection and Switching in ISOBMFF", October 2020, Online, which is hereby incorporated by reference herein in its entirety.

In some embodiments, the available tracks and/or representations can be stored as separate tracks. As described herein, transformation operations can be used to perform track selection and track switching at the sample level (e.g., not the track level). Accordingly, the techniques described herein for derived track selection and track switching can be used to enable track selection and switching, at run time, from a group of available media tracks (e.g., tracks of different bitrates) for delivery to the client device. Therefore, a server can use a derived track that includes selection and switching derivation operations that allow the server to construct a single media track for the user based on the available media tracks (e.g., from among media tracks of different bitrates) and the client's adaptation parameters. For example, the track selection and/or switching can be performed in a manner that selects from among the input tracks to determine which of the input tracks best-suits the client's adaptation parameters. As a result, a number of input tracks (e.g., tracks of different bitrates, qualities, etc.) can be processed by track selection derivation operations to select samples from one of the input tracks at the sample level to generate the media samples of the output track that are dynamically adjusted to meet the client's adaptation parameters as they change over time. As described herein, in some embodiments, the selection-based track derivation can encapsulate track samples as the output from the derivation operation(s) of a derived track. As a result, a track selection derivation operation can provide samples from any of the input tracks to the derivation operation as specified by the transformations of the derived track to generate the resulting track encapsulation of the samples. The resulting (new) track can be transmitted to the client device for playback.

In some embodiments, the client device can provide spatial adaptation information, such as spatial rendering information to the server. For example, in some embodiments the client device can provide viewport information (on a 2D, spherical and/or 3D viewport) to the server for omnidirectional media scenarios. The server can use the viewport information to construct the viewport for the client at the server-side, instead of requiring the client device to perform the stitching and construction of the (the 2D, spherical or 3D) viewport. Accordingly, spatial media processing tasks can be moved to the server-side of adaptive streaming implementations.

In some embodiments, the client can provide other adaptation information, including temporal and/or content-based adaptation information. For example, the client can provide bitrate adaptation information (e.g., for representation switching). As another example, the client can provide temporal adaptation information (e.g., such as for trick plays, low-latency adaptation, fast-turn-ins, and/or the like). As a further example, the client can provide content adaptation information (e.g., for pre-rendering, storyline selection and/or the like). The server-side can be configured to receive and process such adaptation information to provide the temporal and/or content-based adaptation for the client device.

Figure 3:
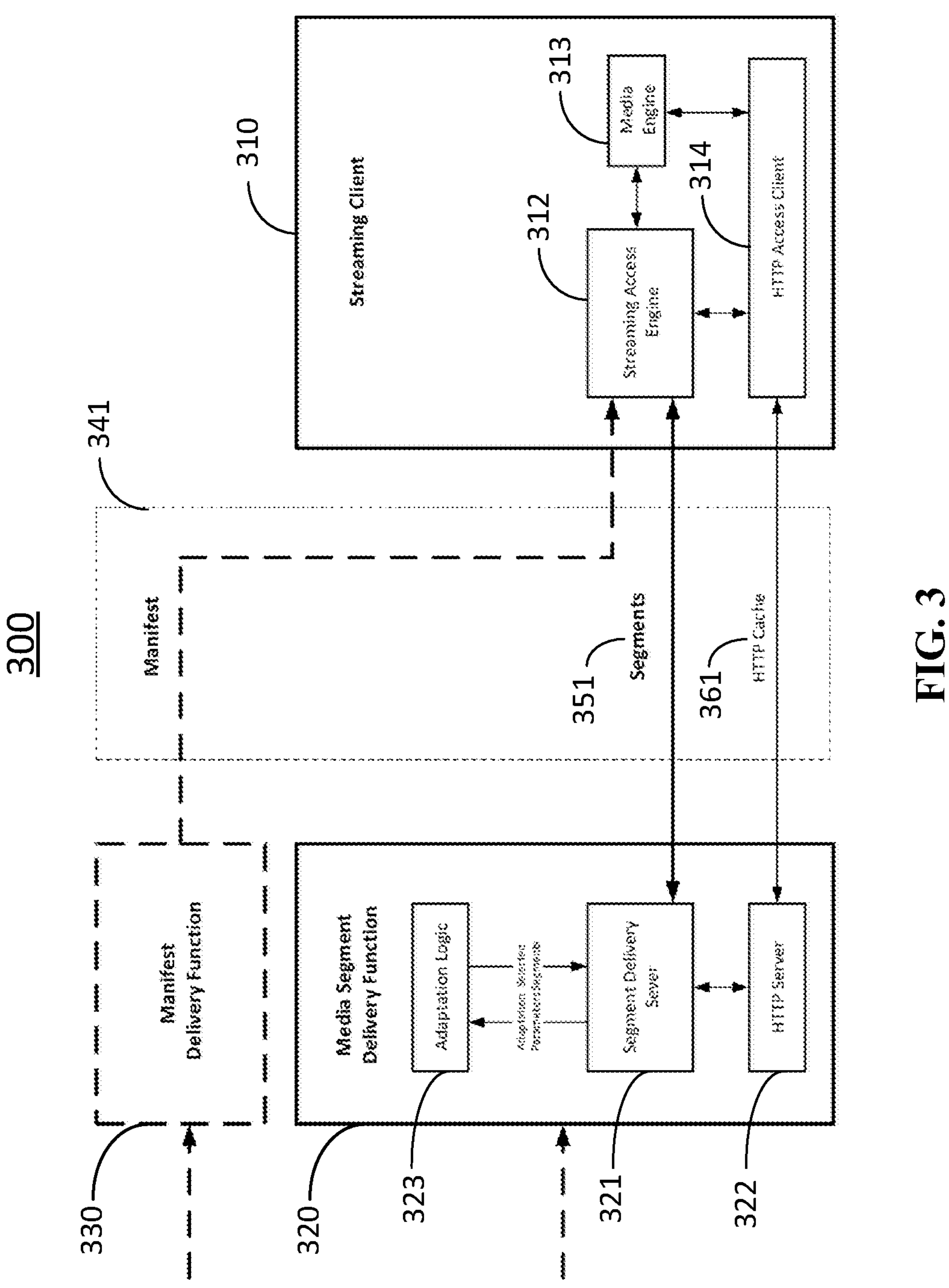
FIG. 3 shows an exemplary configuration of a server-side adaptive streaming system, according to some embodiments.

For example, FIG. 3 shows an exemplary configuration of a server-side adaptive streaming system, according to some embodiments. The configuration 300 includes a streaming client 310 in communication with server 322 via HTTP cache 361. The streaming client 310 includes a streaming access engine 312, a media engine 313, and an HTTP access client 314. The server 322 may be included as part of the media segment delivery function 320, which includes segment delivery server 321. The segment delivery server 321 is configured to transmit segments 351 to the streaming access engine 312 of the streaming client 310. The streaming access engine 312 also receives the manifest 341 from the manifest delivery function 330. Unlike in the example of FIG. 2, the client device does not perform the adaptation logic to select among the available representations and/or segments. Rather, the adaptation logic 323 is incorporated in the media delivery function 320 so that the server-side performs the adaptation logic to dynamically select content based on client adaptation parameters. Accordingly, the streaming client 310 can simply provide adaptation information and/or adaptation parameters to the media segment delivery function 320, which in-turn performs the selection for the client. In some embodiments as described herein, the streaming client 310 can request a general (e.g., placeholder) segment that is associated with the content stream the server generates for the client.

The adaptation parameters can be communicated using various techniques. For example, the adaptation parameters can be provided as query parameters (e.g., URL query parameters), HTTP parameters (e.g., as HTTP header parameters), SAND messages (e.g., carrying adaptation parameters collected by the client and/or other devices), and/or the like. An example of URL query parameters can include, for example: $bitrate=1024, $2D_viewport_x=0, $2D_viewport_y=0, $2D_viewport_width=1024, $2D_viewport_height=512, etc. An example of HTTP header parameters can include, for example: bitrate=1024, 2D_viewport_x=0, 2D_viewport_y=0, 2D_viewport_width=1024, 2D_viewport_height=512, etc.

According to some embodiments, the server performs some and/or all of the adaptation logic that is used to select (e.g., encrypted) segments from a set of available streams as discussed herein. For example, the server device can perform adaptation to select segments from the set of available streams, which may be transmitted from the server to the client device via the content delivery network (CDN) accordingly. The client device can therefore use a single URL as discussed herein to obtain the content from the server (rather than multiple URLs as is typically required for client-side configurations in order to differentiate between different formats of available content (e.g., different bitrates).

According to some embodiments, the invention provides a method of foveated rendering of omnidirectional media content implemented by a server in communication with a client device. According to some embodiments, the invention is to define a time metadata track for a foveated viewport, for instance, to assist client-side foveated rendering, and provide definitions of adaptation parameters in the CTA WAVE CMCD format, for instance, as HTTP header parameters or URL query parameters to support server-side foveated rendering.

According to some embodiments, the foveated viewport timed metadata track indicates the viewport that is foveated rendered or should be displayed using foveated rendering according to the metadata carried within.

If the timed metadata track concerns more than one viewpoint or the referenced media tracks contain media data for more than one viewpoint, the track sample entry type 'fvp2' shall be used. Otherwise, the track sample entry type ' fvvp' or 'fvp2' shall be used.

Each video track referenced by a ' cdsc' track reference from a foveated viewport timed metadata track shall cover the indicated foveated viewports completely for the entire duration of the timed metadata track. The group of video tracks that are referenced by a ' cdtg' track reference from a foveated viewport timed metadata track shall collectively cover the indicated foveated viewports completely for the entire duration of the timed metadata track.

When a foveated viewport timed metadata track is used to derive the viewport and the video track(s) referenced by the foveated viewport timed metadata track have associated overlays, an OMAF player is expected to render the overlays like in rendering of regular and non-foveated viewport.

FIG. 4 shows exemplary syntaxes for sample entry, according to some embodiments.

version shall be equal to 0 when fvvp__info is contained in a ‘ fvvp’ sample entry. version shall be equal to 1 when fvvp_info is contained in ‘rvp2’ sample entry.

viewport description is null-terminated UTF-8 string that provides a textual description of the foveated viewport.

viewpoint_idc equal to 0 specifies that all the media tracks referenced by this timed metadata track represent the same viewpoint. viewpoint_idc equal to 1 specifies that the viewpoint identifiers referenced by the sample entry containing this FvvpInfoBox represent the viewpoint with viewpoint identifier equal to fvif_viewpoint_id. viewpoint_idc equal to 2 specifies that the samples contain viewpoint_id. viewpoint_idc equal to 3 is reserved.

When not present, viewpoint_idc is inferred to be equal to 0.

fvif_viewpoint_id specifies the viewpoint identifier that identifies the viewpoint containing the foveated viewport for the samples referencing the sample entry containing this FvvpInfoBox.

num_foveal_levels specifies the number of foveated area levels as listed in Table 1 below.

TABLE 1

The number of foveated area levels

| Value | Description |
|---|---|
| 0 | foveal only, implying no foveated rendering |
| 1 | foveal and peripheral |
| 2 | foveal, blended and peripheral |
| n > 2 | foveal, n-2 blended and peripheral |

foveal_shape specifies the shape of the foveated viewport as listed in Table 2 below.

TABLE 2

Foveal shape

| Value | Description |
|---|---|
| 0 | A foveated viewport containing a foveal and embedded foveated areas of the shapes of sphere region (of shape_type equal to 0), each specified with a pair of static_azimuth_range and static_elevation_range |
| 1 | A foveated viewport containing a foveal and embedded foveated areas of the shapes of circular region, each specified with a radius static_azimuth_range |
| 2 . . . 239 | Reserved (for use by future extensions of ISO/IEC 23090-2) |
| 240 . . . 255 | Unspecified (for use by applications or external specifications) |

quality_ranking specifies a quality ranking value of the quality ranking sphere region. quality_ranking equal to 0 indicates that the quality ranking value is not defined. The semantics of non-zero quality ranking values are specified in subclause 7.8.1., but now for foveated areas from the foveal outward.

According to some embodiments, this quality_ranking parameter can be replaced or supplemented with another parameter for a bit rate in units of kbps.

FIG. 5 shows exemplary of sample syntax, according to some embodiments.

shape_type shall be equal to 0 in the SphereRegionConfigBox of the sample entry.

static_azimuth_range and static_elevation_range, when present, or azimuth_range and elevation_range, when present, indicate the azimuth and elevation ranges, respectively, of the recommended viewport. centre_azimuth and centre_elevation indicate the centre point of the recommended viewport relative to the global coordinate axes. centre tilt indicates the tilt angle of the recommended viewport.

viewpoint_id specifies the viewpoint identifier of the viewpoint that contains the recommended viewport.

According to some embodiments, in the server-side dynamic adaptation in OMAF TuC, the client can make some static selection (such as those related to video codec profile, screen size and encryption algorithm), and only leave dynamic adaptation (such as those related to video bitrate, network bandwidth) to the server, by collecting and passing dynamic adaptation parameters needed for Adaptation Logic to the server as part of (HTTP) segment requests. The communication of these adaptation parameters can be implemented in anyone of the following mechanisms:

URL query parameters, and/or

HTTP header parameters.

In order to enable foveated rendering at the server-side and to reduce delivery loads for foveated viewports, a list of parameters are defined in the table shown in FIG. 6, which can be used as suggested in the CTA WAVE Common Media Client Data.

FIG. 6 shows a list of adaptation parameters for foveated rendering, according to some embodiments. The adaptation parameters define a viewport and viewpoint related data structure attributes, according to some embodiments. The attributes include azimuth 601, elevation 602, foveal levels 603, foveal shape 604, azimuth range 605, elevation range 606, and quality ranking 607, which are included in SSDA request.

The attribute azimuth 601 may be represented by ‘azim’ and may be an azimuth component of a spherical viewport [OMAF]. The attribute azimuth 601 is an integer indicating an degree. The attribute elevation 602 may be represented by ‘elev’ and may be an elevation component of a spherical viewport [OMAF]. The attribute elevation 602 is an integer indicating a degree.

The attribute foveal levels 603 may be represented by ‘flvl’ and may be a number of foveated area levels. The attribute foveal Levels 603 is an integer. Usually, it is equal to 0: foveal only, implying no foveated rendering; 1: foveal and peripheral; 2: foveal, blended and peripheral; and n>2: foveal, n−2 blended and peripheral. For each level of foveated area of a spherical region shape, a list of azimuth range, elevation range, and quality ranking are provided to indicate. For each level of foveated area of circular region shape, a list of azimuth range and quality ranking are provided to indicate.

The attribute foveal shape 604 may be represented by ‘fovs’ and may be of a foveal shape: 0=rectangular, 1=circle, others=reserved.

The attribute azimuth range 605 may be represented by ‘azim’ and may be an azimuth range of a spherical viewport [OMAF]. The attribute azimuth range 605 is an integer indicating an degree. The attribute elevation range 606 may be represented by 'elev' and may be an elevation range of a spherical viewport [OMAF]. The attribute elevation range 606 is an integer indicating an degree. The quality ranking 607 may be represented by 'qrnk' and may be a quality ranking of a foveated area or region [OMAF]. Note that, if more appropriate, this quality ranking parameter can be replaced or supplemented with another parameter for a bitrate in units of kbps.

With these parameters in DASH HTTP requests for segments related to a foveated viewport, it is expected to return an http response containing:

a foveated viewport segment; this is a server-side adaptation or rendering, or a package of tile/sub-picture segments in an MIME multipart message for constructing a foveated viewport segment, just like in the viewport-dependent media processing, but whose content has been adapted with foveated rendered content separately carried in the tile/sub-picture segments.

Figure 7:
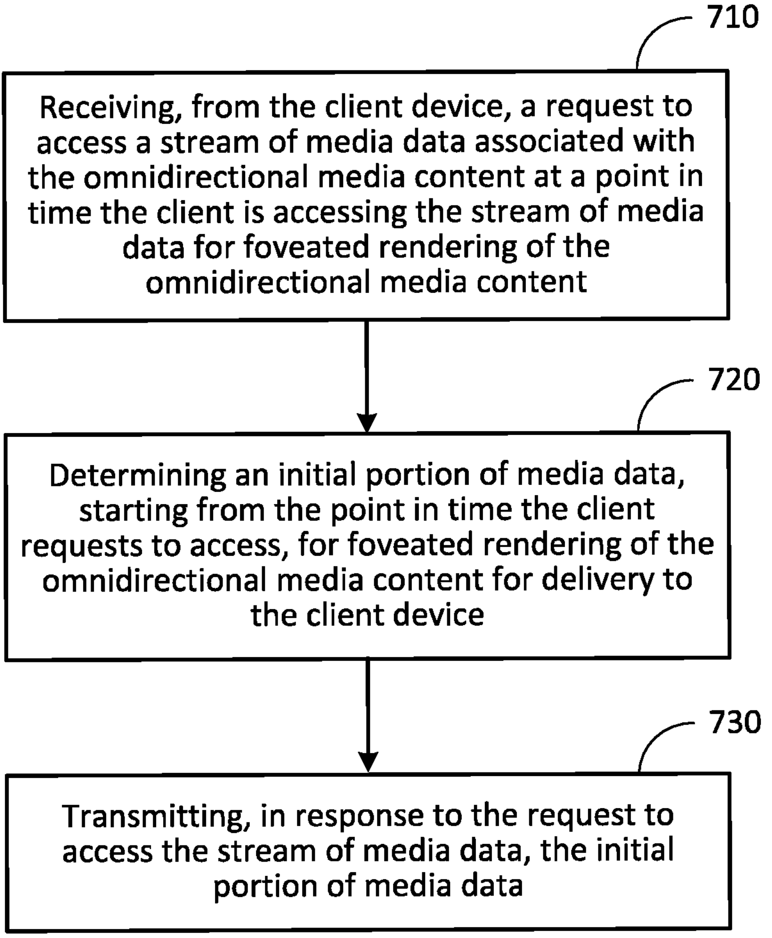
FIG. 7 shows a flowchart of foveated rendering of omnidirectional media content implemented by a server in communication with a client device, according to some embodiments.

Referring to FIG. 7, a flowchart for the method of foveated rendering of omnidirectional media content in a client device is shown according to some embodiments of the invention. The method in some embodiments is implemented by a server in communication with the client device.

According to the method, at step 710, the server receives, from the client device, a request to access a stream of media data (e g. a channel or other source of media data) associated with the omnidirectional media content at a point in time the client is accessing the stream of media data for foveated rendering of the omnidirectional media content. In some embodiments, the request to access the stream of media data associated with the omnidirectional media content may correspond to a point in time the client is first accessing the stream of media data for foveated rendering of the omnidirectional media content or may correspond to any other predefined time the client is accessing the stream of media data for foveated rendering.

In some embodiments, the request comprises parameters for foveated rendering, for example, one ore more adaptation parameters listed in FIG. 6.

In some embodiments, the request to access the stream of media data is an HTTP request (e.g., a Dynamic Adaptive Streaming over HTTP request (DASH), an HTTP live streaming (HLS) request, etc.) and is received from the client device prior to the server transmitting the client device any manifest data for foveated rendering of the omnidirectional media content.

In some embodiments, the request to access the stream of media data comprises one or more parameters that indicate a network bandwidth in terms of bitrates, and a group of media tracks having their bitrates matching the ones in the one or more parameters.

In some embodiments, the one or more dynamic adaptation parameters can be collected by the client device or networks and communicated to the server. For example, the dynamic adaptation parameters may include DASH or SAND parameters and may be used to support bitrate adaptation such as representation switching, temporal adaptation, spatial adaptation such as viewport/viewpoint dependent media processing, and content adaptation such as pre-rendering and storyline selection.

At step 720, the server determines an initial portion of media data, starting from the point in time the client requests to access, for foveated rendering of the omnidirectional media content for delivery to the client device. For example, as described herein, when switching to a stream of media data the server can determine a manifest, initialization segment, and one or more additional media segments for sending to the client device in response to the single request received at step 720. As another example, when a client is requesting to join a live content channel or stream, the server can identify a most recent available content segment for sending to the client device.

In some embodiments, the initial portion of media data comprises a portion of the omnidirectional media content for a viewport that is foveated rendered or to be displayed using foveated rendering on the client device according to the request.

In some embodiments, the initial portion of media data comprises a plurality of stitched media data tiles, each corresponding one of the differential portions of the omnidirectional media content, from the plurality of media tracks.

In some embodiments, said determining the initial portion of the media data for foveated rendering comprises accessing the media data comprising a plurality of media tracks, each media track comprising different media data corresponding to different spatial portions of the omnidirectional media content; determining, based on the request, a group of media tracks from the plurality of media tracks corresponding to a viewport of the client device; and generating a single track adapted to comprise the initial portion of media data and transmitting the adapted track comprising the initial portion of media data to the client device.

At step 730, the server transmits, in response to the request to access the stream of media data, the initial portion of media data to the client device. In some embodiments, the initial portion of media data is transmitted prior to, or in conjunction with, transmitting first manifest data for foveated rendering of the omnidirectional media content to the client device. The initial portion of media data may comprise one or more low-quality media data segments. In some examples, the initial portion of media data includes an initialization segment.

In some examples, the omnidirectional media content is live omnidirectional media content and the point in time is the latest time of the live omnidirectional media content that the server possesses. In some embodiments, the request to access the stream of media data comprises one or more parameters of the live omnidirectional media content, the client device, or a combination thereof.

It should be noted that all or a part of the steps of the method according to the embodiments of the invention is implemented by hardware or a software module executed by a processor, or implemented by a combination thereof. In one aspect, the invention provides a system comprising at least one processor configured to perform the method of foveated rendering of omnidirectional media content as disclosed above.

Yet another aspect of the invention provides a non-transitory tangible computer-readable medium storing instructions which, when executed by one or more processors, cause a system to perform the above-disclosed method of foveated rendering of omnidirectional media content. The computer executable instructions or program codes enable a computer or a similar computing system to complete various operations in the above disclosed method of foveated rendering of omnidirectional media content. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, other non-volatile solid state storage devices, or any other type of non-transitory computer readable recoding medium commonly known in the art.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of foveated rendering of omnidirectional media content implemented by a server in communication with a client device, the method comprising:

receiving, from the client device, a request to access a stream of media data associated with the omnidirectional media content at a point in time the client is accessing the stream of media data for foveated rendering of the omnidirectional media content, wherein the request comprises adaptation parameters for foveated rendering in a CTA WAVE Common Media Client Data (CMCD) format;

determining an initial portion of media data, starting from the point in time the client requests to access, for foveated rendering of the omnidirectional media content for delivery to the client device;

defining a time metadata track for a foveated viewport, the time metadata track indicating the viewport that is foveated rendered or should be displayed using foveated rendering according to metadata carried within the time metadata track, to assist client-side foveated rendering; and transmitting, in response to the request to access the stream of media data, the initial portion of media data and the time metadata track, wherein the initial portion of media data comprises a portion of the omnidirectional media content for a viewport that is foveated rendered or to be displayed using foveated rendering on the client device according to the request.

2. The method of claim 1, wherein:

the request to access the stream of media data is an HTTP request and is received from the client device prior to the server transmitting the client device any manifest data for foveated rendering of the omnidirectional media content; and the initial portion of media data is transmitted prior to, or in conjunction with, transmitting first manifest data for foveated rendering of the omnidirectional media content to the client device.

3. The method of claim 1, wherein the request comprises the adaptation parameters for foveated rendering as HTTP header parameters or URL query parameters to support server-side foveated rendering.

4. The method of claim 1, wherein said determining the initial portion of the media data for foveated rendering comprises:

accessing the media data comprising a plurality of media tracks, each media track comprising different media data corresponding to different spatial portions of the omnidirectional media content;

determining, based on the request, a group of media tracks from the plurality of media tracks corresponding to a viewport of the client device; and generating a single track adapted to comprise the initial portion of media data and transmitting the adapted track comprising the initial portion of media data to the client device.

5. The method of claim 4, wherein the initial portion of media data comprises a plurality of stitched media data tiles, each corresponding one of the differential portions of the omnidirectional media content, from the plurality of media tracks.

6. The method of claim 1, wherein the omnidirectional media content is live omnidirectional media content and the point in time is the latest time of the live omnidirectional media content that the server possesses.

7. The method of claim 6, wherein the request to access the stream of media data comprises one or more parameters of the live omnidirectional media content, the client device, or a combination thereof.

8. The method of claim 1, wherein the request to access the stream of media data comprises one or more parameters that indicate a network bandwidth in terms of bitrates, and a group of media tracks having their bitrates matching the ones in the one or more parameters.

9. The method of claim 1, wherein the request to access the stream of media data comprises one or more parameters configured to support bitrate adaptation including representation switching, temporal adaptation, spatial adaptation including viewport/viewpoint dependent media processing, and/or content adaptation including pre-rendering and storyline selection.

10. A system, comprising:

at least one processor configured to perform a method of foveated rendering of omnidirectional media content, the method comprising:

receiving, from a client device, a request to access a stream of media data associated with the omnidirectional media content at a point in time the client is accessing the stream of media data for foveated rendering of the omnidirectional media content, wherein the request comprises adaptation parameters for foveated rendering in a CTA WAVE Common Media Client Data (CMCD) format;

determining an initial portion of media data, starting from the point in time the client requests to access, for foveated rendering of the omnidirectional media content for delivery to the client device;

defining a time metadata track for a foveated viewport, the time metadata track indicating the viewport that is foveated rendered or should be displayed using foveated rendering according to metadata carried within the time metadata track, to assist client-side foveated rendering; and transmitting, in response to the request to access the stream of media data, the initial portion of media data and the time metadata track, wherein the initial portion of media data comprises a portion of the omnidirectional media content for a viewport that is foveated rendered or to be displayed using foveated rendering on the client device according to the request.

11. The system of claim 10, wherein:

the request to access the stream of media data is an HTTP request and is received from the client device prior to the server transmitting the client device any manifest data for foveated rendering of the omnidirectional media content; and the initial portion of media data is transmitted prior to, or in conjunction with, transmitting first manifest data for foveated rendering of the omnidirectional media content to the client device.

12. The system of claim 10, wherein said determining the initial portion of the media data for foveated rendering comprises:

accessing the media data comprising a plurality of media tracks, each media track comprising different media data corresponding to different spatial portions of the omnidirectional media content;

determining, based on the request, a group of media tracks from the plurality of media tracks corresponding to a viewport of the client device; and generating a single track adapted to comprise the initial portion of media data and transmitting the adapted track comprising the initial portion of media data to the client device.

13. The system of claim 10, wherein the omnidirectional media content is live omnidirectional media content and the point in time is the latest time of the live omnidirectional media content that the server possesses.

14. The system of claim 10, wherein the request to access the stream of media data comprises one or more parameters that indicate a network bandwidth in terms of bitrates, and a group of media tracks having their bitrates matching the ones in the one or more parameters.

15. The system of claim 10, wherein the request to access the stream of media data comprises one or more parameters configured to support bitrate adaptation including representation switching, temporal adaptation, spatial adaptation including viewport/viewpoint dependent media processing, and/or content adaptation including pre-rendering and storyline selection.

* * * * *